(12) United States Patent
Barth et al.

(10) Patent No.: US 9,761,099 B1
(45) Date of Patent: Sep. 12, 2017

(54) CONFIGURABLE SENSOR

(71) Applicant: Alarm.com Incorporated, Tysons, VA (US)

(72) Inventors: Adam T. Barth, Annandale, VA (US); Mark Andrew Hanson, Fairfax, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/069,126

(22) Filed: Mar. 14, 2016

Related U.S. Application Data

(60) Provisional application No. 62/133,126, filed on Mar. 13, 2015.

(51) Int. Cl.
  *G08B 13/08* (2006.01)
  *G08B 13/196* (2006.01)
  *G06K 9/00* (2006.01)

(52) U.S. Cl.
  CPC ....... *G08B 13/08* (2013.01); *G08B 13/19608* (2013.01); *G08B 13/19613* (2013.01); *G06K 9/00771* (2013.01)

(58) Field of Classification Search
  CPC .......... E05Y 2400/322; H04L 12/2803; G08B 13/19608; G08B 13/19613; G08B 31/00; G06K 9/00771; G06T 7/20
  See application file for complete search history.

(56) References Cited

U.S. PATENT DOCUMENTS

| | | | | |
|---|---|---|---|---|
| 2007/0011722 A1* | 1/2007 | Hoffman | ......... | G08B 13/19608 726/3 |
| 2010/0208063 A1* | 8/2010 | Lee | ..................... | G06K 9/00771 348/143 |
| 2010/0238030 A1* | 9/2010 | Shafer | .................. | G08B 13/193 340/552 |
| 2015/0163412 A1* | 6/2015 | Holley | ................... | G05B 15/02 348/143 |
| 2016/0084678 A1* | 3/2016 | Ricks | ....................... | G01D 5/40 250/340 |
| 2016/0189508 A1* | 6/2016 | Peterson | ............ | G08B 13/2491 340/547 |

\* cited by examiner

*Primary Examiner* — Mizra Alam
(74) *Attorney, Agent, or Firm* — Fish & Richardson P.C.

(57) ABSTRACT

Methods and systems, including computer programs encoded on computer storage media, for providing an indication of a direction a person passes through a door in a property, the method including receiving, at a sensing device and from a control panel of an alarm system in a property, instructions to provide an indication of a direction a person passes through a door in the property; obtaining motion data using a motion sensor that is included in the sensing device; detecting the opening of the door using a magnetometer included in the sensing device; based on the obtained motion data and detected opening of the door, determining a direction a person passed through the door; and providing, to the control panel, an indication of the direction the person passed through the door.

20 Claims, 11 Drawing Sheets

CONFIGURABLE SENSOR

CROSS REFERENCE TO RELATED APPLICATIONS

The present application claims the benefit of U.S. Provisional Application No. 62/133,126, filed Mar. 13, 2015, which is incorporated herein by reference in its entirety for all purposes.

TECHNICAL FIELD

This disclosure relates to monitoring technology and, for example, a sensor for a monitoring system.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for a sensor for a monitoring system. For example, techniques are described for a configurable sensor.

In general, one innovative aspect of the subject matter described in this specification can be embodied in methods that include the actions of receiving, at a sensing device and from a control panel of an alarm system in a property, instructions to provide an indication of a direction a person passes through a door in the property; obtaining motion data using a motion sensor that is included in the sensing device; detecting the opening of the door using a magnetometer or accelerometer included in the sensing device; based on the obtained motion data and detected opening of the door, determining a direction a person passed through the door; and providing, to the control panel, an indication of the direction the person passed through the door.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the motion sensor is located inside the property.

In other implementations determining a direction a person passed through the door comprises determining whether the person opened the door from inside the property and subsequently exited the property; and determining whether the person opened the door from outside the property and subsequently entered the property.

In some cases determining whether the person opened the door from inside the property and subsequently exited the property comprises determining that (i) motion data immediately before the detected opening of the door indicates that a person was standing before the door, and (ii) motion data at a predetermined amount of time after the detected opening of the door indicates that the person was no longer standing before the door.

In other cases determining whether the person opened the door from the outside of the property and subsequently entered the property comprises determining that (i) motion data immediately before the detected opening of the door indicates that a person was not standing before the door, and (ii) motion data at a predetermined amount of time after the detected opening of the door indicates that the person was standing before the door.

In some implementations the method further comprises sending the obtained motion data and data representing the detected opening and closing of the door to the control panel.

In other implementations the sent obtained motion data and data representing the detected opening and closing of the door may be used by the control panel to determine an occupancy of the property.

In some cases the method further comprises determining, by the magnetometer included in the sensing device, a reference magnetic field that corresponds to the door being closed.

In further cases determining the reference magnetic field comprises measuring, by the magnetometer, a magnetic field when the door is closed; and storing the measured magnetic field as a measurement for a reference magnetic field.

In some implementations measuring, by the magnetometer, a magnetic field comprises receiving manual input instructing the magnetometer to measure a magnetic field; in response to receiving instructions to measure the magnetic field, measuring, by the magnetometer, the magnetic field.

In other implementations measuring, by the magnetometer, a magnetic field comprises executing one or more software commands at the control panel of the alarm system that causes the magnetometer to measure the magnetic field.

In some cases detecting the opening of the door using the magnetometer comprises detecting that a deviation of the magnetic field from the reference magnetic field exceeds a predetermined magnitude or angle.

In other cases the method further comprises, based on the deviation of the magnetic field from the reference magnetic field, determining how wide the door is open.

In some implementations the method further comprises accounting for a drift in the reference magnetic field.

In other cases the sensing device is further configured to detect changes in temperature, humidity and light.

In some cases detected changes in temperature, humidity and light may be used to determine occupancy of the property.

In some implementations the sensing device comprises a configurable sensor. In further implementations the configurable sensor comprises a single contact door open and close sensor.

The subject matter described in this specification can be implemented in particular embodiments so as to realize one or more of the following advantages. A configurable sensor that combines multiple sensing elements into one wireless sensor may reduce a number of components or products required in a monitoring system whilst maintaining high levels of surveillance and reporting accuracy. By combining multiple sensing elements into one wireless sensor, the configurable sensor is applicable to a variety of monitoring and surveillance tasks and is able to consolidate different types of sensor activity to improve the accuracy of the monitoring system to which it belongs.

A configurable sensor may include a single contact device with an in-built magnetometer used to detect when doors open or close. The single contact device may be mounted to any door, regardless of the door shape or size, and may be used to determine an accurate measure of how wide open a door is. In addition, by combining different types of data sensed by the configurable sensor, such as motion data and data indicating detected door openings, a property monitoring system is able to improve surveillance accuracy and determine additional measures of interest relating to the property. For example, the configurable sensor may determine a direction a person passes through when using the door, which may in turn be used by the monitoring system to determine a current occupancy of the property.

The details of one or more implementations are set forth in the accompanying drawings and the description below. Other features will be apparent from the description and drawings, and from the claims.

DETAILED DESCRIPTION

Techniques are described for a configurable sensor. A configurable sensor of a monitoring system may be able to sense multiple different characteristics of an environment. For instance, the configurable sensor may include a light sensor that measures an amount of light, a humidity sensor that measures an amount of humidity, a temperature sensor that measures a temperature, a magnetometer that measures a magnetic field, an accelerometer that measures acceleration, and a pyroelectric passive infrared ("PIR") sensor that measures infrared. The combination of the various sensors into a single configurable sensor may reduce the number of separate sensors and enable additional functionality. For instance, the magnetometer or accelerometer and a PIR sensor may together to be used by the configurable sensor to determine directions that people pass through a door. The configurable sensor may be dynamically reconfigured so that particular sensors of the configurable sensor may be turned on and off depending on whether measurements from the particular sensor are desired. For instance, a configurable sensor that is placed on a wall may be generally used to sense temperature, humidity, and light, so in a default use, the configurable sensor may turn on the temperature sensor, the humidity sensor, and the light sensor. In the example, when a tornado warning is in effect, the configurable sensor may be notified of the tornado warning and in response, turn on one or more of the remaining sensors, e.g., magnetometer, accelerometer, or PIR sensor.

Figure 1:
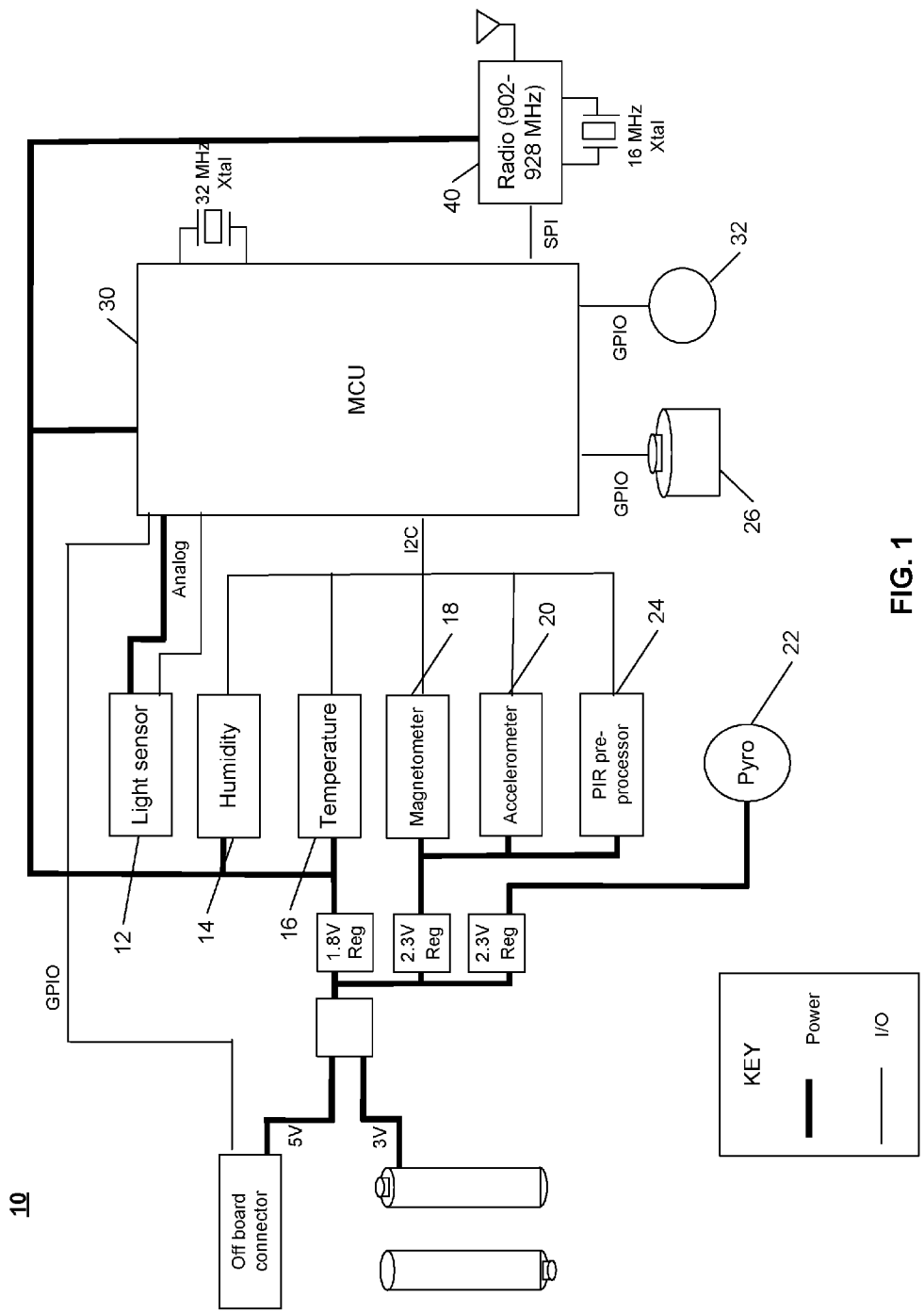
FIG. 1 illustrates a block diagram of an example configurable sensor.

FIG. 1 illustrates an example configurable sensor 10. The configurable sensor 10 may include a light sensor 12, a humidity sensor 14, a temperature sensor 16, a magnetometer 18, an accelerometer 20, a PIR sensor 22, a PIR pre-processor 24, a button 26, a microcontroller (MCU) 30, light indicators 32, and a radio 40. The configurable sensor 10 shown in FIG. 1 is merely an example and a configurable sensor may include more, fewer, or different types of sensors.

The light sensor 12 may measure an intensity of light at the configurable sensor 10. The humidity sensor 14 may measure a humidity at the configurable sensor 10. The temperature sensor 16 may measure a temperature at the configurable sensor 10. The magnetometer 18 may measure a magnetic field at the configurable sensor 10. The accelerometer 20 may measure acceleration or orientation of the configurable sensor 10. The PIR sensor 22 may detect infrared light, e.g., heat, at the configurable sensor 10, and the PIR pre-processing 24 may perform some pre-processing of the data provided by the PIR sensor 22. The button 26 may detect when the button 26 is pressed.

The sensors in the configurable sensor 10 may all be in communication with the MCU 30. The MCU 30 may control the sensors using the communications. For example, the MCU may send communications that cause the sensors to be turned on and turned off. The MCU 30 may receive and process data from the sensors. For instance, the MCU 30 may receive data from both the magnetometer 18 and PIR sensor 22, determine from the data that someone walked from inside a property to outside the property through a door, and generate data indicating a person walked from inside the property to outside the property through the door. The sensors and MCU 30 may communicate through one or more of an inter-integrated circuit protocol (I²C) or a general-purpose input/output (GIPO) protocol. The MCU 30 may process data from the sensors or control the sensors based on applications running on the MCU 30. For example, the MCU 30 may run various applications that use different sensor data to perform different functions.

The MCU 30 may be in communication with light indicators 32. The light indicators 32 may indicate a status of the configurable sensor 10. For example, the light indicators 32 may display a green light to indicate that the MCU 30 is powered on and monitoring, or a red light to indicate that the MCU 30 is powered on but is not monitoring.

The MCU 30 may be in communication with the radio 40. The MCU 30 may provide communications to the radio 40 to wirelessly transmit, or receive communications from the radio 40. For instance, the MCU 30 may send sensor data to a monitoring system control panel through the radio 40, and receive instructions to enable or disable particular sensors or applications from the monitoring system control panel. The MCU 30 may communicate with the radio 40 using a serial peripheral interface (SPI) protocol. The radio 40 may work in the 902-928 MHz range.

The configurable sensor 10 may be powered by one or more of batteries or an external power source. The batteries may provide a 3 Volt power source and the external power source may provide a 5 Volt power source, although different batteries providing different voltages and different external power sources providing different voltages may be used. The configurable sensor 10 may include voltage regulators that output particular voltage levels for components of the configurable sensor 10. For instance, the light sensor 12, the humidity sensor 14, the temperature sensor 16, the MCU 30, and the radio 40 may all function on 1.8 Volts, so a 1.8 Volt regulator may receive power from one or more of batteries or an external power source and output 1.8 Volts. Similarly, the magnetometer 18, the accelerometer 20, the PIR preprocessor 24, and the PIR sensor 22 may all function on 2.3 Volts, and may receive output from one or more 2.3 Volt regulators.

In some implementations, the configurable sensor 10 may include a external sensor port. The external sensor port may be a port that provides other sensors to be interchangeably connected to the configurable sensor 10. The configurable sensor 10 may implement a low-power overhead protocol to detect when sensors are connected through the virtual sensor port and communicate with those sensors.

In some implementations, the configurable sensor 10 may also enable configurations to be stored and carried over when firmware on the configurable sensor 10 is updated. The configurable sensor 10 may receive a header and use the header to determine differences between a previous firmware version and current firmware version.

Figure 2:
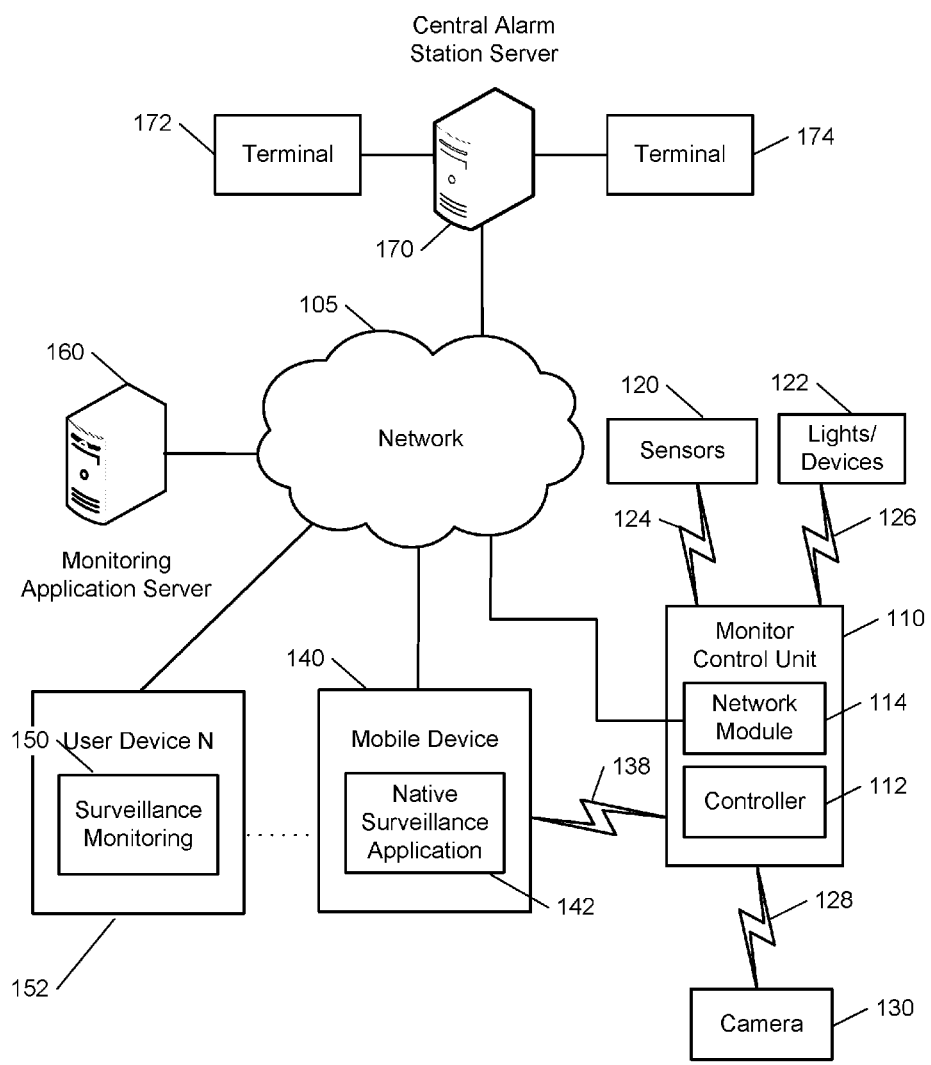
FIG. 2 illustrates an example system.

FIG. 2 illustrates an example of an electronic system 200 configured to provide surveillance and reporting. The electronic system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance, monitoring, and/or control operations. The module 122 is connected to one or more lighting systems and/or one or more household devices (e.g., thermostat, oven, range, etc.) and is configured to control operation of the one or more lighting systems and/or the one or more household devices. The module 122 may control the one or more lighting systems and/or the one or more household devices based on commands received from the monitoring system control unit 110. For instance, the module 122 may cause a lighting system to illuminate an area to provide a better image of the area when captured by a camera 130. The module 122 also may control the one or more lighting systems and/or the one or more household devices to perform energy management and/or user convenience operations (e.g., adjusting a temperature setting of a thermostat and turning an oven off and on to meet energy management and user convenience goals).

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may include a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more mobile devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 1 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interfaces and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 1 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some examples, the sensors 120 may include a configurable sensor that is similar to that described above in FIG. 1. When a configurable sensor is introduced into the system 200, the system 200 may determine the capabilities of the configurable sensor and configure the configurable sensor in accordance with sensing desired by the system 200. For instance, the configurable sensor may indicate to the system 200 that the configurable sensor is being added to the system 200 and provide an indication of the capabilities of the configurable sensor. In the example, the configurable sensor may provide an indication of the capabilities of the configurable sensor by either identifying the configurable sensor where the system 200 knows the capabilities of particular configurable sensors, or identifying functions the configurable sensor may perform.

The system 200 may also configure the configurable sensor. For example, a user may indicate to the system 200 that the configurable sensor is being used to only monitor use of a door. In response, the system 200 may determine to enable an application for monitoring a door on the configurable sensor and disable other applications, and transmit a communication to the configurable sensor to enable the application for monitoring the door and disable other applications. The configurable sensor may receive the communication and in response, turn off sensors that are not related to monitoring the door and turn on sensors that are related to monitoring the door. In some implementations, the configurable sensor may determine to turn on and off sensors without external input. For instance, the configurable sensor may determine that the configurable sensor is almost out of battery power, and in response, turn off sensors that consume a large amount of power to maintain providing an indication that the battery power of the configurable sensor is low. In another example, the configurable sensor may similarly stop applications to reduce power consumption.

In some implementations, the system 200 may change a configuration of a configurable sensor based on sensor data from other sensors. For instance, the system 200 may determine that another temperature sensor is no longer providing accurate sensor data, e.g., malfunctioning or not powered, determine that the system 200 includes a configurable sensor that is not monitoring temperature but is capable of monitoring temperature, and in response, provide an instruction to the configurable sensor that configures the configurable sensor to begin also monitoring temperature. In the example, the system 200 may determine when the temperature sensor begins providing accurate sensor data again, determine that the system 200 temporarily reconfigured the configurable sensor to monitor temperature, and in response, provide an instruction to the configurable sensor that configures the configurable sensor to stop monitoring temperature. In yet another example, the system 200 may determine from other sensors that an intruder has been detected in a property, and in response, provide instructions to all configurable sensors to begin sensing anything the configurable sensor may sense to increase the amount of sensor data captured for the intrusion.

Figure 3A:
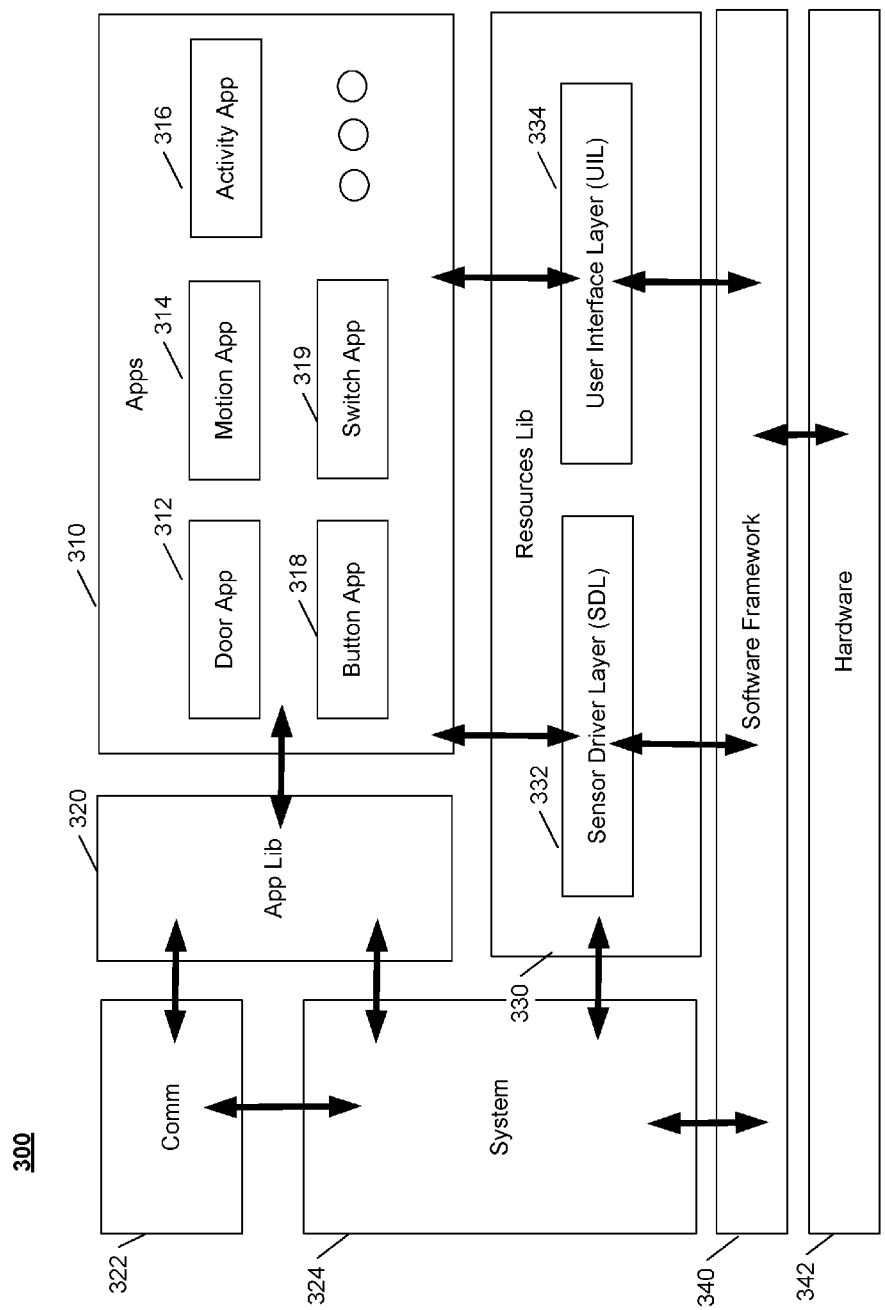
FIGS. 3A and 3B illustrate example architectures of a configurable sensor.
Figure 3B:
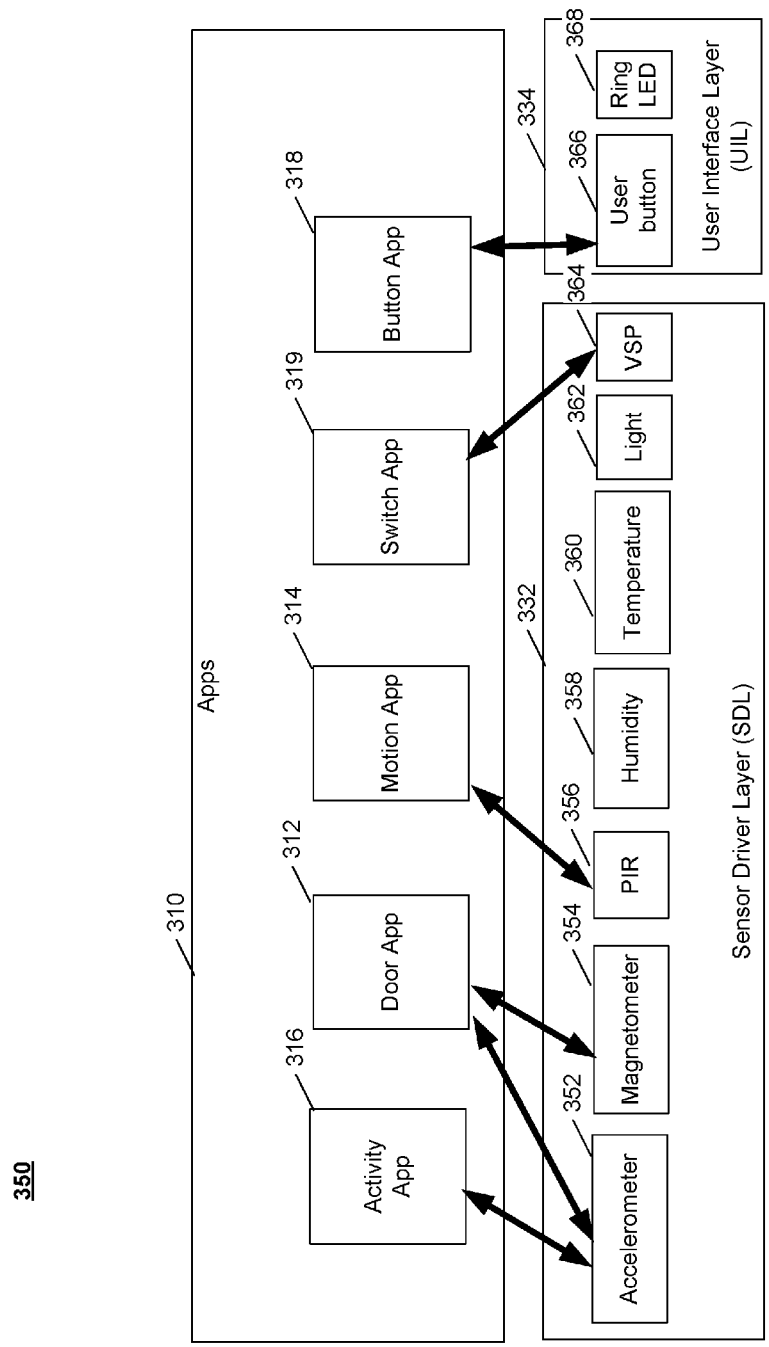

FIGS. 3A and 3B illustrate architectures of an example configurable sensor. The example configurable sensor may be similar to the configurable sensor shown in the block diagram of FIG. 1. As shown in FIG. 3A, the architecture 300 of the configurable sensor includes an application block 310, an application library block 320, a communication block 322, a system block 324, a resource library block 330, a software framework block 340, and a hardware block 342.

The application block 310 may include blocks that represent a door application 312, a motion application 314, an activity application 316, a button application 318, and a switch application 319. The door application 312 may be an application that detects one or more of an opening or closing of a door, a status of a door, e.g., opened or closed, or a direction through which a door was passed. The motion application 314 may determine when a motion is detected. The activity application 316 may detect when the configurable sensor is moved. The button application 318 may detect when a button is pressed and when the button is released. The switch application 319 may detect a status of a switch, e.g., whether the switch is set in an open or close state. The application block 310 shown in FIG. 3A is merely an example and additional, fewer, and different applications may be used.

The application library block 320 may represent libraries that may be used by the applications. For instance, the libraries may include application program interfaces (API) that the applications may use. The libraries may restrict access or prevent unwanted access by the applications of the application block 310 to lower level resources.

The communication block 322 may represent a communication management process. The communication management process may manage communications between the system block 324 and the application library block 320. For instance, the communication management process may queue communications to be sent to the system block 324. The system block 324 may represent a system management process. The system management process may manage timing, port interrupts and event executions.

The resource library block 330 may include a sensor driver layer block 332 and a user interface layer block 334. The sensor driver layer block 332 and the user interface layer block 334 may serve as an interface, for the applications of the application block 310 or the system management process of system block 324, to request resources and manage contention for those resources. The software framework block 340 may represent a lower-level interface to the hardware represented by the hardware block 342.

As shown in FIG. 3B, particular applications may interface with particular sensors and interfaces. For example, the activity application 316 may use sensor data from the accelerometer drivers 352, the door application 312 may use sensor data from the accelerometer drivers 352 and magnetometer drivers 354, the motion application 314 may use sensor data from the PIR sensor drivers 356, the switch application 319 may use sensor data from virtual sensor port drivers, and the button application may use sensor data from a button interface layer.

As shown, a particular application may use sensor data from one or more sensors. The configurable sensor may determine the sensors that will provide the sensor data for applications currently running on the configurable sensor, and keep those sensors on. Conversely, the configurable sensor may determine the sensors that will provide sensor data that will not be used by applications currently on the configurable sensor, and in response, turn off those sensors. For example, as shown in FIG. 3B, an accelerometer, a magnetometer, a PIR sensor, a VSP sensor, and a user button may be turned on, and a humidity sensor, a temperature sensor, and a light sensor may be turned off. The configurable sensor may make this determination of which sensors to enable or disable one or more of every time an application is enable, every time an application is disabled, or periodic intervals.

Figure 4:
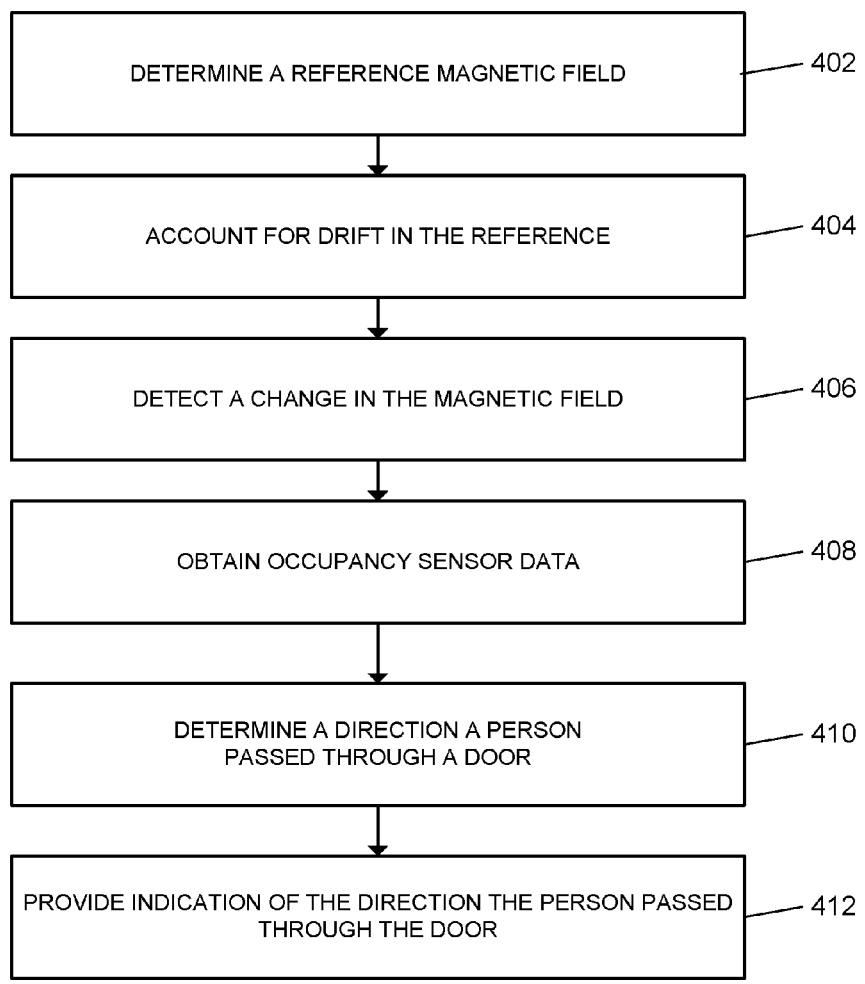
FIG. 4 is a flow chart of an example process for providing an indication of a direction a person passes through a door in a property.
Figure 5:
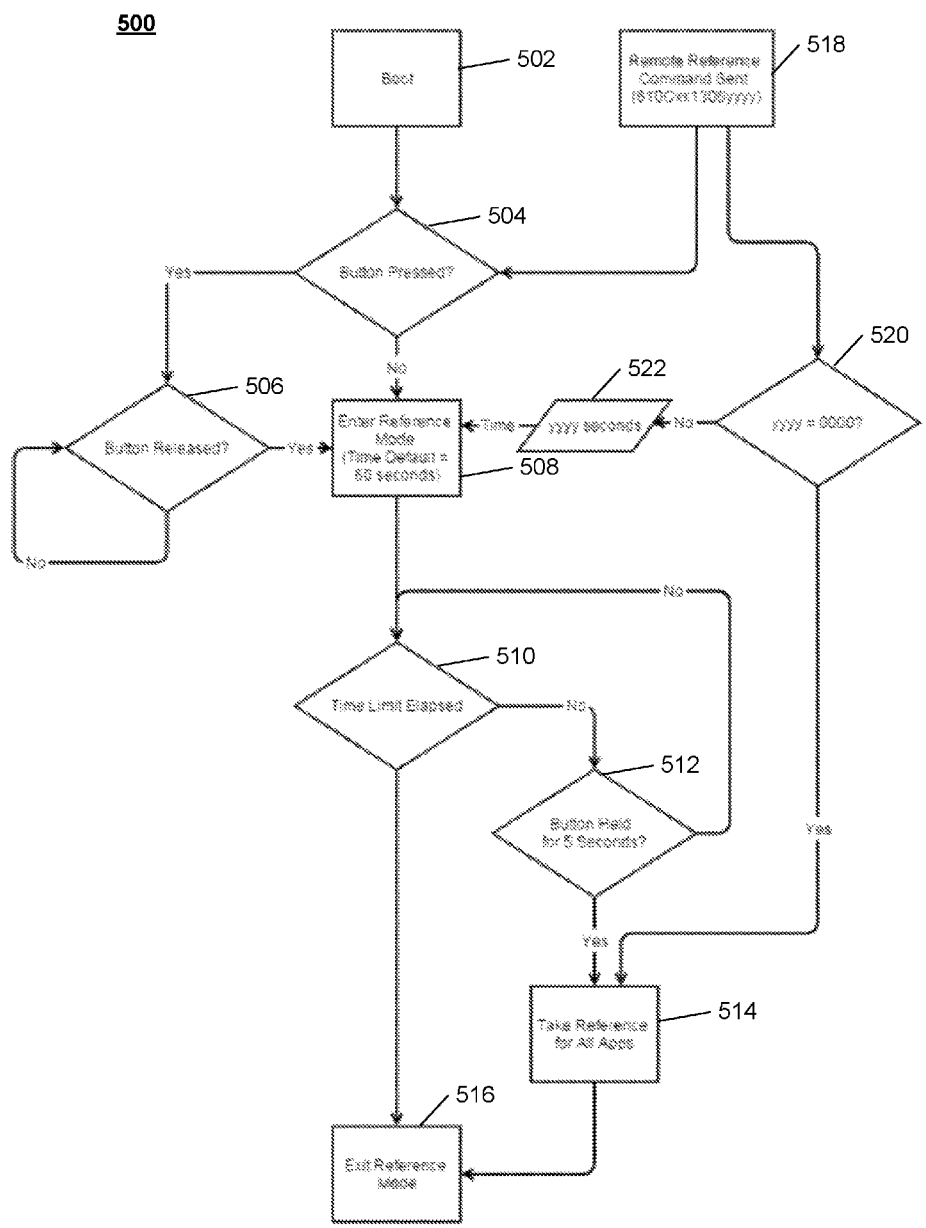
FIG. 5 is a flow chart of an example process for setting references.

FIGS. 4 and 5 are flow charts of example processes, with FIG. 4 illustrating an example process for a configurable sensor to provide an indication of a direction a person passes through a door and FIG. 5 illustrating an example process for a configurable sensor to set references. As shown in FIG. 4, a configurable sensor may determine a reference magnetic field (402). For instance, a configurable sensor may be configured to have a door application running and may be placed on an interior side of a door leading to outside a property. In the example, a button of the configurable sensor may be held down for five seconds when the door is closed to cause the configurable sensor to measure a current magnetic field with a magnetometer and store the measurements as measurements for a reference magnetic field.

The configurable sensor may account for drift in the reference magnetic field (402). The magnetic field sensed by the magnetometer of the configurable sensor may slightly change across time. For instance, temperature variations or aging of the magnetometer may cause the magnetometer to sense the magnetic field differently. These slight changes may be referred to as drift. Accordingly, the configurable sensor may avoid false positives or false negatives by accounting for the drift. The configurable sensor may account for drift in the reference magnetic field based at least on determining that if a change in a currently sensed magnetic field satisfies a similarity threshold, e.g., 90% or 95% similar, to the reference magnetic field and is held constant for a time threshold, e.g., one minute, one hour, one day, or one week, etc., the reference magnetic field will be updated to match the currently sensed magnetic field.

The configurable sensor may detect a change in the magnetic field (406). For example, when the door swings open, the configurable sensor may detect that a magnetic field sensed by the configurable sensor is now 90 degrees different than the reference magnetic field, and in response, determine that the door has opened.

The configurable sensor may obtain occupancy sensor data (408). For example, the configurable sensor may obtain PIR sensor data for a few seconds before the door is opened to a few seconds after the door is closed. The PIR sensor data for the configurable sensor placed on an interior side of the door may indicate when a person was standing in front of the side of the door inside the house.

The configurable sensor may determine a direction a person passed through the door (410). The configurable sensor may determine the direction the person passed through the door using both the detected change in the magnetic field and the occupancy sensor data. For instance, the configurable sensor may determine that a person was opening the door from inside the house and then walked outside when the occupancy sensor data immediately before the magnetic field changed indicates that a person was standing before the door, and a person was no longer standing before the door after two seconds. In another example, the configurable sensor may determine that a person was opening the door from outside the house and then walked inside when the occupancy sensor data immediately before the magnetic field changed indicates that a person was not standing before the door, and a person was standing before the door after two seconds.

The configurable sensor may provide the indication of the direction the person passed through the door (412). For instance, in response to determining that a person walked through a door from the outside of a house, the configurable sensor may generate an indication that the person walked through the door from the outside of the house and transmit the indication to a monitoring system control panel. In another example, in response to determining that a person walked through a door from the inside of a house, the configurable sensor may generate an indication that the person walked through the door from the inside of the house and transmit the indication to a monitoring system control panel.

The monitoring system may use the indication to determine an occupancy of the house. For instance, the monitoring system may determine that when a house is unoccupied but someone walks through the door from outside the house, the house is then occupied. In another example, the monitoring system may determine that when a house is only occupied by a single person and someone walks through the door from the inside of the house to outside, the house is then unoccupied.

In some implementations the configurable sensor may include an accelerometer and additionally or alternatively determine a direction that the person passed through the door using the accelerometer. For example, instead of a magnetometer, the configurable sensor may include an accelerometer and determine when a door opens and closes based on the door accelerating or decelerating. In some implementations, if the configurable sensor determines that no motion was detected in front of the inside side of the door before the accelerometer sensed that a door was opened, then the configurable sensor may determine that a person walked into the house through the door and if the configurable sensor determines that motion was detected in front of the inside side of the door before the accelerometer sensed that a door was opened, then the configurable sensor may determine that a person walked out of the house through the door. In some implementations, the configurable sensor may determine a direction that a person passed through the door based on both the magnetometer and accelerometer. For example, the configurable sensor may provide an indication of a direction only if the information from the magnetometer and the accelerometer both separately indicate that a person walked through the door in the same particular direction and otherwise provide an indication that the direction could not be determined, or provide an indication of a direction only if the magnetometer and accelerometer information are not conflicting, e.g., magnetometer information indicating a particular direction and accelerometer information indicating a direction cannot be determined still results in an indication of the particular direction, and otherwise, e.g., the magnetometer and accelerometer information indicating different directions, provide an indication that the direction could not be determined.

FIG. 5 illustrates an example process 500 for a configurable sensor to set references. For instance, the configurable sensor may use the process to set a reference magnetic field. The configurable sensor may set references based on a pressing of a button on the configurable sensor or a remote command received by the configurable sensor.

The configurable sensor may boot (502). For instance, the configurable sensor may be powered on. The configurable sensor may determine if a button is pressed (504). If the button is pressed, the configurable sensor may wait until the button is released (506).

Once the button is released, or if the button was not pressed in 504, the configurable sensor may enter a reference mode (508). The reference mode may last a specified or default time limit. A default time limit may be sixty seconds. The configurable sensor may determine whether the time limit has elapsed (510). While the time limit has not elapsed, the configurable sensor may determine if a button on the configurable sensor has been held for five seconds (512). If the button has not been held for five seconds, the configurable sensor may wait until either the button is held for five seconds or the time limit elapses.

If the configurable sensor determines that the button is held for five seconds, the configurable sensor may take a reference for all applications (514). For instance, the configurable sensor may determine all applications that are currently being run on the configurable sensor, and in response, set the current measurements of the various sensors used by the applications as reference measurements for the applications. Accordingly, a reference magnetic field may be set for a door application. The configurable sensor may then exit the reference mode (516). Alternatively, if the time limit elapses before the button is held for five seconds, the configurable sensor may also exit the reference mode.

After booting, the configurable sensor may also receive a remote reference command (518). For instance, the configurable sensor may receive a command from a control panel to set references. The remote reference command may specify a time limit. For example, the time limit specified may be zero seconds to two minutes.

The configurable sensor may determine if the time limit is zero seconds (520). If the time limit is zero seconds, the configurable sensor may proceed to enter the reference mode as described for 508, where the time limit of the reference mode is set to the time limit specified by the command. If the time limit is zero, the configurable sensor may proceed to take a reference for all applications as described for 514.

Figure 6A:
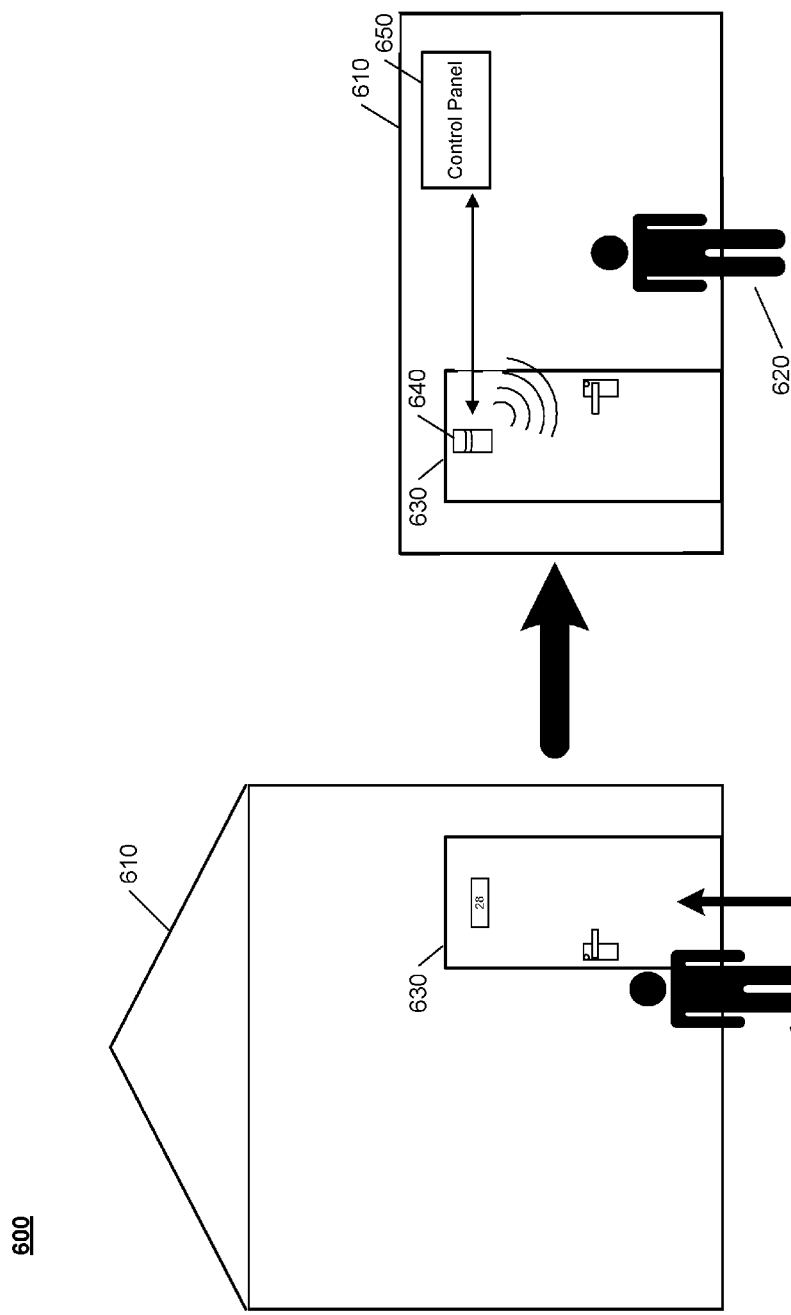
FIGS. 6A and 6B illustrate example processes for providing an indication of a direction a person passes through a door in a property.
Figure 6B:
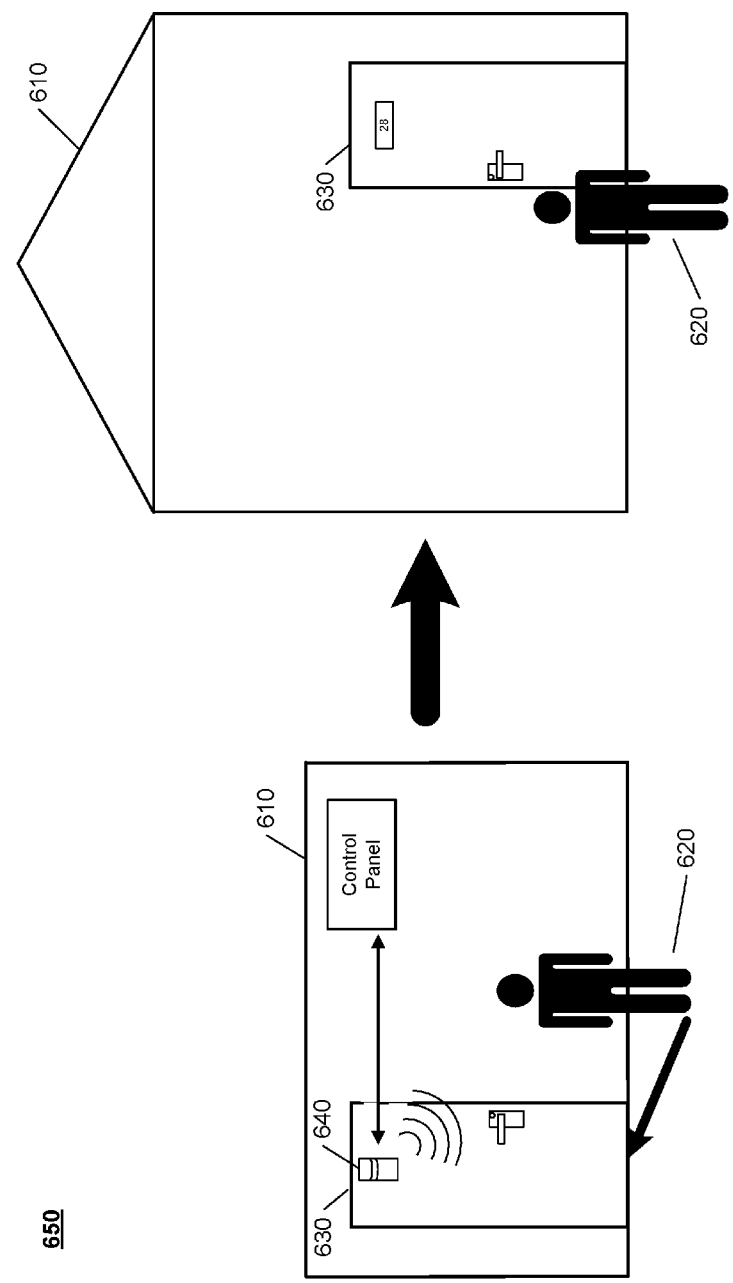

FIGS. 6A and 6B illustrate example processes for providing an indication of a direction a person passes through a door in a property. For example, as illustrated in FIG. 6A, a person 620 may be approaching door 630 of property 610 from the outside. At a later time, e.g., a number of seconds, the person 620 may have entered property 610 through door 630. A sensing device 640 affixed on the side of the door 630 facing the inside of the property 610 may include a magnetometer that detects changes in a magnetic field and a passive infrared sensor that detects motion by sensing infrared energy emitted by objects, e.g., people.

As the person 620 opens the door 630, sensing device 640 may detect a change in the magnetic field. For example, as the door swings open, the sensing device 640 may detect that a magnetic field sensed by the sensing device 640 is changing and at some point is 90 degrees different than the reference magnetic field, i.e., the magnetic field sensed when the door is closed.

As the person 620 enters the property 610 through the door 630, sensing device 640 may further detect the movement of the person 620 and obtain motion data indicating the presence of person 620 within the property. In some implementations the opening of the door 630 may automatically trigger the sensing device 640 to obtain motion data, e.g., for a few seconds after the door 630 was opened. In other implementations the sensing device 640 may always be obtaining to obtain motion data.

The sensing device 640 may determine that the person 620 entered the property using the detected change in magnetic field and the obtained motion data. An example process for determining that a person has entered a property is described in more detail below with reference to FIG. 9.

As illustrated in FIG. 6B, a person 620 may be approaching the inside of door 630 within property 610. At a later time, e.g., a number of seconds, the person 620 may have exited the property 610 through door 630.

As the person 620 leaves the property 610 through door 630, sensing device 640 may detect the movement of person 620 and obtain motion data indicating the presence of person 620 within the property.

As the person 620 opens the door 630, sensing device 640 may detect a change in the magnetic field. For example, as the door swings open, the sensing device 640 may detect that a magnetic field sensed by the sensing device 640 is 90 degrees different than the reference magnetic field, i.e., the magnetic field sensed when the door is closed.

The sensing device 640 may determine that the person 620 exited the property using the detected change in magnetic field and the obtained motion data. An example process for determining that a person has exited a property is described in more detail below with reference to FIG. 8.

Figure 7:
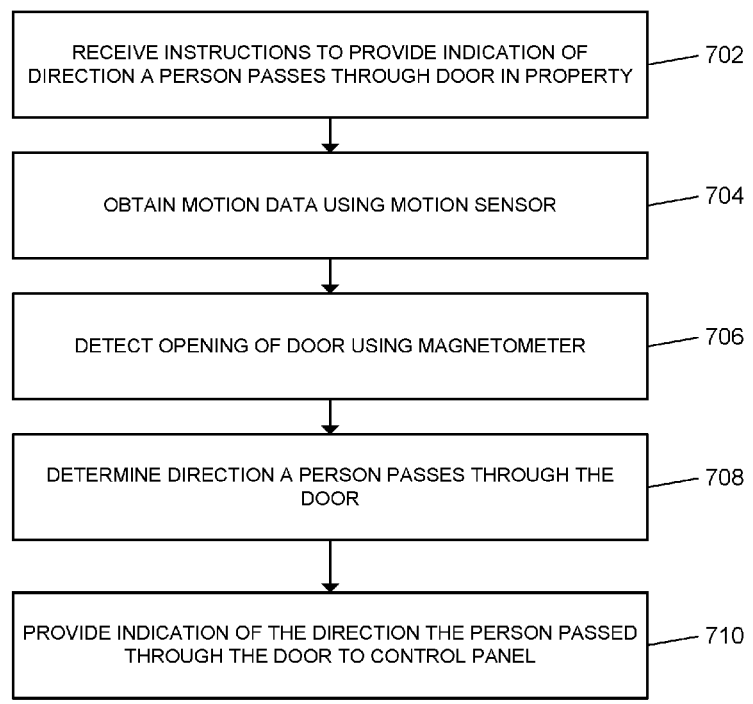
FIG. 7 is a flow chart of an example process for providing an indication of a direction a person passes through a door in a property.

FIG. 7 is a flow chart of an example process for providing an indication of a direction a person passes through a door in a property. For convenience, the process 700 will be described as being performed by a system of one or more computers located in one or more locations. For example, a surveillance and monitoring system, e.g., the electronic system 200 of FIG. 2, appropriately programmed in accordance with this specification, can perform the process 700.

The system receives, at one or more sensors and from a control panel 650 of an alarm system in a property 610, instructions to provide an indication of a direction a person passes through a door 630 in the property (702). In some implementations the one or more sensors may constitute a single configurable sensor 640, also referred to as a sensing device. The configurable sensor 640 may be configured to detect changes in magnetic field, temperature, humidity and light. In some implementations the detected changes in magnetic field, temperature, humidity and light may be used to determine an occupancy of the property, as described in more detail below. An example configurable sensor is described in more detail above with reference to FIG. 1.

The system obtains motion data using a motion sensor that is included in the one or more sensors (704). For example, as described above with reference to FIG. 2, the motion sensor may be a Passive Infra Red motion sensor or a microwave motion sensor. In some implementations the motion may be located inside the property 610, e.g., discretely positioned near or on the front door 630 of the property.

The system detects the opening of the door 630 using a magnetometer included in the one or more sensors (706). In order to detect the opening of the door 630 using a magnetometer the system may determine, by the magnetometer, a reference magnetic field that corresponds to the door being closed. For example, the system may measure, by the magnetometer, a magnetic field when the door is closed and store the measured magnetic field as a measurement for a reference magnetic field. In some implementations the system may receive manual input instructing the magnetometer to measure the magnetic field and in response for receiving the instructions the magnetometer may measure the magnetic field. In other implementations one or more software commands may be executed at the control panel of the alarm system that causes the magnetometer to measure the magnetic field. A process for setting a reference magnetic field is described above with reference to FIG. 5.

The system may detect the opening of the door 630 using the magnetometer by detecting that a deviation of the magnetic field from the reference magnetic field exceeds a predetermined number of degrees. In some implementations, based on the deviation of the magnetic field from the reference magnetic field, the system may determine how wide open the door is. The system may account for a drift in the reference magnetic field when determining whether a deviation of the magnetic field from the reference magnetic field exceeds a predetermined number of degrees. For example, the magnetic field sensed by the magnetometer may naturally change slightly over time, due to, for example, temperature variations or aging of the magnetometer. The system may therefore account for this natural drift in order to avoid false positive or false negative readings. Accounting for drift in the reference magnetic field is described in more detail above with reference to FIG. 4.

Based on the obtained motion data and detected opening of the door, the system determines a direction a person 620 passed through the door (708). In some implementations the system determines a direction the person 620 passed through the door by determining whether the person 620 opened the door 630 from inside the property 610 and subsequently exited the property 610. For example, the system may determine that (i) motion data immediately before the detected opening of the door 630 indicates that a person 620 was standing before the door 630, and (ii) motion data at a predetermined amount of time after the detected opening of the door indicates that the person 620 was no longer standing before the door 630, as illustrated in FIG. 6B above.

In other implementations the system determines a direction the person 620 passed through the door 630 by determining whether the person 620 opened the door 630 from outside the property 610 and subsequently entered the property 610. For example, the system may determine that (i) motion data immediately before the detected opening of the door 630 indicates that a person 620 was not standing before the door 630, and (ii) motion data at a predetermined amount of time after the detected opening of the door 630 indicates that the person 620 was standing before the door 630, as illustrated in FIG. 6A above.

The system provides, to the control panel 650, an indication of the direction the person 620 passed through the door 630. In some implementations the system may further send the motion data obtained above with reference to step 704 and data representing the detected opening and closing of the door to the control panel as described above with reference to step 706. In some implementations the sent motion data and data representing the detected opening and closing of the door 630 may be used by the control panel 650 to determine an occupancy of the property 610. For example, the control panel 650 may determine an occupancy of the property 610 by determining the occupancy of the property 610 prior to receiving the indication of the direction the person 620 passed through the door, and, based on the indication of the direction the person 620 passed through the door 630, updating the occupancy of the property 610.

Figure 8:
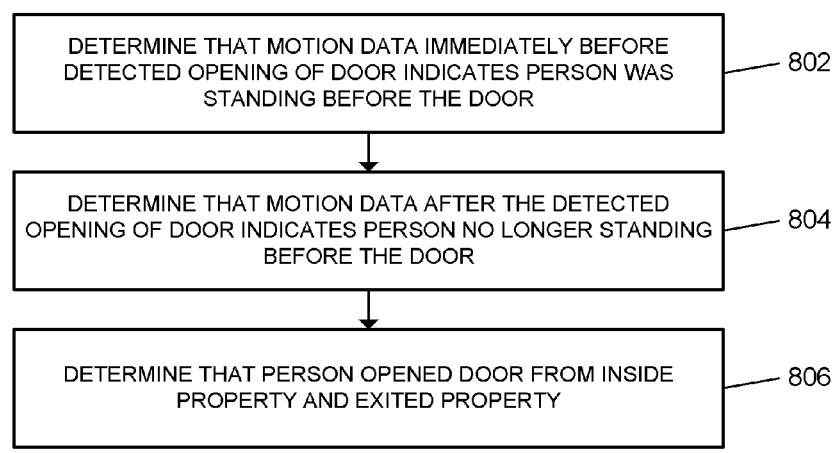
FIG. 8 is a flow chart of an example process for determining that a person exits a property.

FIG. 8 is a flow chart of an example process for determining that a person exits a property. For convenience, the process 800 will be described as being performed by a system of one or more computers located in one or more locations. For example, a surveillance and monitoring system, e.g., the electronic system 200 of FIG. 2, appropriately programmed in accordance with this specification, can perform the process 800.

The system determines that motion data immediately before a detected opening of the door 630 indicates that a person 620 was standing before the door 630 (802). For example, a sensing device 640 may be mounted near or on the side of the door 630 that is inside the property 610. As an occupant of the property 610 approaches the door 630, the sensing device 640 may be triggered and motion data indicating the presence of a person 620 may be logged and provided to the system.

The system determines that motion data after the detected opening of the door 630 indicates that a person 620 is no longer standing before the door (804). For example, as described above, a sensing device 640 may be mounted near or on the side of the door 630 that is inside the property 610.

As an occupant of the property 610 leaves the property 610, the sensing device 640 may provide motion data indicating that a person 620 is no longer standing before the door 630. For example, in some cases the sensing device 640 may be configured to record motion data a few seconds after the door 630 is opened. The system may use this data to determine that a person 620 is no longer standing before the door 630. In other cases the system may determine that a lack of motion data after the detected opening of the door 630 indicates that no motion was recorded after the door 630 was opened, that is a person 620 was no longer standing before the door.

The system determines that a person 620 opened the door 630 from the inside of the property 610 and exited the property (806). For convenience, the process 800 has been described for system in which a sensing device 640 is mounted near or on the side of the door 630 that is inside the property 610. In other implementations the sensing device 640 may be mounted near or on the side of the door that is outside the property 610, and the process steps 802 and 804 may be adjusted accordingly.

Figure 9:
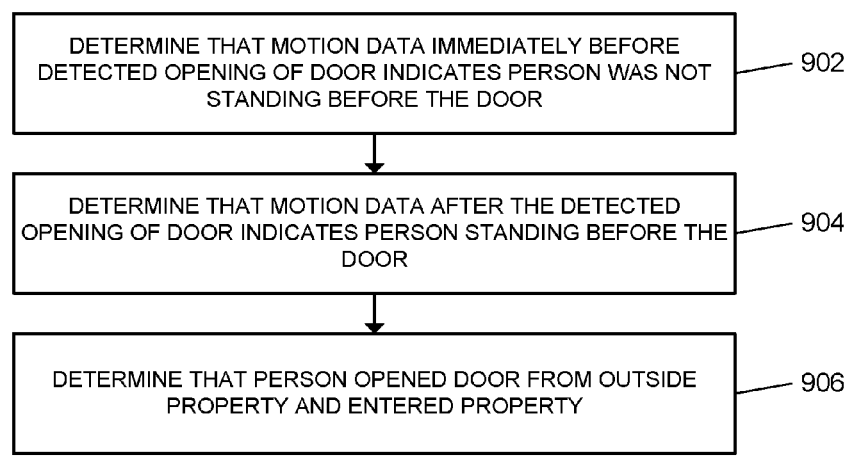
FIG. 9 is a flow chart of an example process for determining that a person enters a property.

FIG. 9 is a flow chart of an example process for determining that a person 620 enters a property. For convenience, the process 900 will be described as being performed by a system of one or more computers located in one or more locations. For example, a surveillance and monitoring system, e.g., the electronic system 200 of FIG. 2, appropriately programmed in accordance with this specification, can perform the process 900.

The system determines that motion data immediately before a detected opening of the door 630 indicates that a person 620 was not standing before the door 630 (902). For example, a sensing device 640 may be mounted near or on the side of the door 630 that is inside the property 610. Prior to an occupant of the property 610 entering the property 610, the sensing device 640 may provide motion data indicating that a person 620 is not standing before the inside of the door 630. In some cases the system may determine that a lack of recorded motion data before the detected opening of the door 630 indicates that no motion was recorded before the door 630 was opened, that is a person 620 was not standing before the inside of the door 630.

The system determines that motion data after the detected opening of the door 630 indicates that a person 620 is standing before the door 630 (904). For example, a sensing device 640 may be mounted near or on the side of the door 630 that is inside the house. As an occupant of the property 610 enters the property 610, the sensing device 640 may be triggered and motion data indicating the presence of a person 620 may be logged and provided to the system.

The system determines that a person 620 opened the door 630 from the outside of the property and entered the property 610 (906). For convenience, the process 900 has been described for system in which a sensing device 640 is mounted near or on the side of the door 630 that is inside the property 610. In other implementations the motion sensor may be mounted near or on the side of the door that is outside the property, and the process steps 902 and 804 may be adjusted accordingly.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A method comprising:
receiving, at a sensing device and from a control panel of an alarm system in a property, instructions to provide an indication of a direction a person passes through a door in the property, wherein the sensing device is configured to be affixed on a side of a door and includes a motion sensor and at least one of a magnetometer or an accelerometer;
obtaining, by the sensing device, motion data using the motion sensor that is included in the sensing device, wherein the motion data indicates whether a person is on a first side of the door;
detecting, by the sensing device, an opening of the door using the magnetometer or the accelerometer included in the sensing device;
determining, by the sensing device, a direction a person passed through the door based on:
determining, by the sensing device, whether the motion data obtained by the sensing device indicates a person was on the first side of the door before the sensing device detected from the magnetometer or the accelerometer that the door was opened; and
providing, by the sensing device to the control panel of the alarm system, an indication of the direction the person passed through the door.

2. The method of claim 1, wherein the motion sensor is located inside the property.

3. The method of claim 2, wherein determining a direction a person passed through the door comprises:
- determining whether the person opened the door from inside the property and subsequently exited the property; and
- determining whether the person opened the door from outside the property and subsequently entered the property.

4. The method of claim 3, wherein determining whether the person opened the door from inside the property and subsequently exited the property comprises determining that (i) motion data immediately before the detected opening of the door indicates that a person was standing before the door, and (ii) motion data at a predetermined amount of time after the detected opening of the door indicates that the person was no longer standing before the door.

5. The method of claim 3, wherein determining whether the person opened the door from the outside of the property and subsequently entered the property comprises determining that (i) motion data immediately before the detected opening of the door indicates that a person was not standing before the door, and (ii) motion data at a predetermined amount of time after the detected opening of the door indicates that the person was standing before the door.

6. The method of claim 1, further comprising sending the obtained motion data and data representing the detected opening and closing of the door to the control panel.

7. The method of claim 6, wherein the sent obtained motion data and data representing the detected opening and closing of the door is used by the control panel to determine an occupancy of the property.

8. The method of claim 1, further comprising determining, by the magnetometer included in the sensing device, a reference magnetic field that corresponds to the door being closed.

9. The method of claim 8, wherein determining the reference magnetic field comprises:
- measuring, by the magnetometer, a magnetic field when the door is closed; and
- storing the measured magnetic field as a measurement for a reference magnetic field.

10. The method of claim 9, wherein measuring, by the magnetometer, a magnetic field comprises:
- receiving manual input instructing the magnetometer to measure a magnetic field; and
- in response to receiving instructions to measure the magnetic field, measuring, by the magnetometer, the magnetic field.

11. The method of claim 9, wherein measuring, by the magnetometer, a magnetic field comprises executing one or more software commands at the control panel of the alarm system that causes the magnetometer to measure the magnetic field.

12. The method of claim 10, wherein detecting the opening of the door using the magnetometer comprises detecting that a deviation of the magnetic field from the reference magnetic field exceeds a predetermined number of degrees.

13. The method of claim 12, further comprising, based on the deviation of the magnetic field from the reference magnetic field, determining how much the door is opened.

14. The method of claim 12, further comprising accounting for a drift in the reference magnetic field.

15. The method of claim 1, wherein the sensing device is further configured to detect changes in temperature, humidity and light.

16. The method of claim 15, wherein detected changes in temperature, humidity and light may be used to determine occupancy of the property.

17. The method of claim 1, wherein the sensing device comprises a configurable sensor.

18. The method of claim 17, wherein the configurable sensor comprises a single contact sensor.

19. A system comprising:
- one or more computers and one or more storage devices storing instructions that are operable, when executed by the one or more computers, to cause the one or more computers to perform operations comprising:
  - receiving, at a sensing device and from a control panel of an alarm system in a property, instructions to provide an indication of a direction a person passes through a door in the property, wherein the sensing device is configured to be affixed on a side of a door and includes a motion sensor and at least one of a magnetometer or an accelerometer;
  - obtaining, by the sensing device, motion data using the motion sensor that is included in the sensing device, wherein the motion data indicates whether a person is on a first side of the door;
  - detecting, by the sensing device, an opening of the door using the magnetometer or the accelerometer included in the sensing device;
  - determining, by the sensing device, a direction a person passed through the door based on:
    - determining, by the sensing device, whether the motion data obtained by the sensing device indicates a person was on the first side of the door before the sensing device detected from the magnetometer or the accelerometer that the door was opened; and
  - providing, by the sensing device to the control panel of the alarm system, an indication of the direction the person passed through the door.

20. A non-transitory computer-readable medium storing software comprising instructions executable by one or more computers which, upon such execution, cause the one or more computers to perform operations comprising:
- receiving, at a sensing device and from a control panel of an alarm system in a property, instructions to provide an indication of a direction a person passes through a door in the property, wherein the sensing device is configured to be affixed on a side of a door and includes a motion sensor and at least one of a magnetometer or an accelerometer;
- obtaining, by the sensing device, motion data using the motion sensor that is included in the sensing device, wherein the motion data indicates whether a person is on a first side of the door;
- detecting, by the sensing device, an opening of the door using the magnetometer or the accelerometer included in the sensing device;
- determining, by the sensing device, a direction a person passed through the door based on:
  - determining, by the sensing device, whether the motion data obtained by the sensing device indicates a person was on the first side of the door before the sensing device detected from the magnetometer or the accelerometer that the door was opened; and
- providing, by the sensing device to the control panel of the alarm system, an indication of the direction the person passed through the door.

* * * * *